US011202307B2

(12) United States Patent
Yi et al.

(10) Patent No.: US 11,202,307 B2
(45) Date of Patent: Dec. 14, 2021

(54) METHOD FOR TRANSMITTING UPLINK DATA WHICH IS ROBUST TO COLLISION ON SHARED UPLINK RESOURCE IN WIRELESS COMMUNICATION SYSTEM AND A DEVICE THEREFOR (71) Applicant: LG Electronics Inc., Seoul (KR)

(72) Inventors: Seungjune Yi, Seoul (KR); Sunyoung Lee, Seoul (KR); Gyeongcheol Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 44 days.

(21) Appl. No.: 16/630,770

(22) PCT Filed: Sep. 21, 2018

(86) PCT No.: PCT/KR2018/011282
§ 371 (c)(1),
(2) Date: Jan. 13, 2020

(87) PCT Pub. No.: WO2019/066420
PCT Pub. Date: Apr. 4, 2019

(65) Prior Publication Data
US 2021/0153234 A1   May 20, 2021

Related U.S. Application Data (60) Provisional application No. 62/564,299, filed on Sep. 28, 2017.

(51) Int. Cl.
*H04W 72/12* (2009.01)
*H04W 4/40* (2018.01)
(Continued)

(52) U.S. Cl.
CPC ......... *H04W 72/1284* (2013.01); *H04W 4/40* (2018.02); *H04W 28/0278* (2013.01); *H04W 72/1268* (2013.01); *H04W 74/08* (2013.01)

(58) Field of Classification Search
CPC ......... H04W 72/1284; H04W 72/1268; H04W 74/08; H04W 4/40; H04W 28/0278
See application file for complete search history.

(56) References Cited

U.S. PATENT DOCUMENTS 9,357,562 B2 * 5/2016 Quan ................ H04W 52/0216
9,807,795 B2 * 10/2017 Jeong .................... H04W 74/02
(Continued)

FOREIGN PATENT DOCUMENTS

| WO | 2016/182342 A1 | 11/2016 |
| WO | 2016175495 A1 | 11/2016 |
| WO | 2017146781 A1 | 8/2017 |

OTHER PUBLICATIONS

International Search Report from PCT/KR2018/011282, dated Jan. 14, 2019.
(Continued)

*Primary Examiner* — Robert C Scheibel
(74) *Attorney, Agent, or Firm* — Dentons US LLP (57) ABSTRACT The present invention relates to a wireless communication system. More specifically, the present invention relates to a method and a device for transmitting uplink data which is robust to collision on shared uplink resource in wireless communication system, the method comprising: checking whether uplink data is allowed to transmit on contention based resource or not, when the uplink data becomes available for transmission; and transmitting a buffer status reporting (BSR) on the contention based resource without any uplink data, if the uplink data is not allowed to transmit on the contention based resource.

12 Claims, 10 Drawing Sheets (51) Int. Cl.
   *H04W 28/02*      (2009.01)
   *H04W 74/08*      (2009.01)

(56) References Cited

U.S. PATENT DOCUMENTS

| | | | |
|---|---|---|---|
| 2011/0039568 A1* | 2/2011 | Zhang | H04W 52/50 |
| | | | 455/452.1 |
| 2012/0275381 A1* | 11/2012 | Kim | H04W 74/08 |
| | | | 370/328 |
| 2016/0100430 A1* | 4/2016 | Dabeer | H04W 72/08 |
| | | | 370/329 |
| 2016/0127092 A1 | 5/2016 | Zhang | |
| 2017/0273108 A1 | 9/2017 | Damnjanovic et al. | |
| 2018/0324811 A1* | 11/2018 | Hu | H04W 72/14 |

OTHER PUBLICATIONS

Written Opinion of the ISA from PCT/KR2018/011282, dated Jan. 14, 2019.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.4.0 (Sep. 2017).
R2-100125: 3GPP TSG-RAN WG2 #68bis, Valencia, Spain, Jan. 18-22, 2010, Ericsson, "Impacts of contention based uplink in RAN2," (3 Pages).

* cited by examiner

(a) Control-Plane Protocol Stack (b) User-Plane Protocol Stack

(a) Control-Plane Protocol Stack (b) User-Plane Protocol Stack

METHOD FOR TRANSMITTING UPLINK DATA WHICH IS ROBUST TO COLLISION ON SHARED UPLINK RESOURCE IN WIRELESS COMMUNICATION SYSTEM AND A DEVICE THEREFOR

This application is a National Stage Entry of International Application No. PCT/KR2018/011282 filed Sep. 21, 2018, which claims the benefit of U.S. Provisional Application No. 62/564,299 filed Sep. 28, 2017, all of which are hereby incorporated by reference in their entirety for all purposes as if fully set forth herein.

TECHNICAL FIELD

The present invention relates to a wireless communication system and, more particularly, to a method for transmitting uplink data which is robust to collision on shared uplink resource in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

Figure 1:
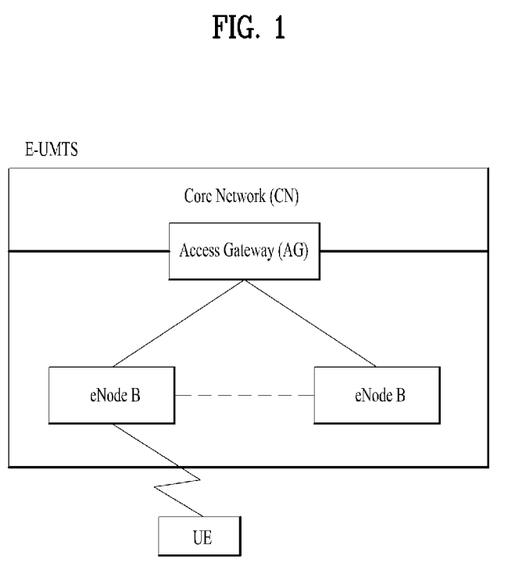
FIG. 1 is a diagram showing a network structure of an Evolved Universal Mobile Telecommunications System (E-UMTS) as an example of a wireless communication system.

FIG. 1 is a view schematically illustrating a network structure of an Evolved Universal Mobile Telecommunications System (E-UMTS) as an exemplary radio communication system. The E-UMTS is an advanced version of a conventional Universal Mobile Telecommunications System (UMTS) and basic standardization thereof is currently underway in the 3GPP. E-UMTS may be generally referred to as a Long Term Evolution (LTE) system. The communication network is widely deployed to provide a variety of communication services such as voice (VoIP) through IMS and packet data.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE and NR based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention devised to solve the problem lies in a method and device for transmitting uplink data which is robust to collision on shared uplink resource in wireless communication system.

Given that the characteristic of metering application, it may assume that a NB-IoT UE would be stationary after deployment in a field.

From the resource point of view, the SPS resource would be a shared SPS resource because it may not be realistic to allocate the dedicated SPS resource to each UE in a cell, even though long-time regular transmission is considered. Assuming a shared SPS resource, contention/collision on the shared SPS resource is inevitable. However, when collision happens on the shared SPS resource, retransmission or resolution may not be needed because the network gathers metering reports from a lot of UEs and calculate the results based on lots of reports. We think that one missing report would not impact on the result of calculation and the information of a missing metering report may be estimated by metering reports of neighbors.

In using UL SPS for metering, it would be helpful to differentiate SPS resource depending on e.g., type of data, or event. For example, the network may want to allocate SPS resource with less or no collision for the data reported in emergency case while allocating SPS resource with reasonable collision for regular metering report in normal case. Therefore, it would be necessary to allocate multiple SPS resources for a UE, where each SPS resource is associated with specific types of data, event, or logical channels.

On the other hand, if only one SPS resource is allocated to a UE, the UE has to transmit all types of data on the shared SPS resource. However, the UE may have data that requires less or no collision. In this case, it is harmful for the UE to transmit such important data on the shared SPS resource. Thus, it is necessary that the UE is allowed to transmit only BSR on the shared SPS resource depending on the type of data.

That is, the network may configure a UE with shared uplink resource, e.g., shared SPS, and shared CB-PUSCH, which are commonly used by multiple UEs. If collision happens, the network may not be able to identify which UEs transmitted uplink data, and thus, the network cannot provide uplink grant for retransmission. Therefore, only uplink data which is robust to collision needs to be transmitted by using shared uplink resource.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

The present invention provides a method for transmitting only BSR on the shared SPS resource depending on the type of data in order to indicate that the UE wants to transmit important data so that the network would allocate dedicated UL grant to the UE.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2A:
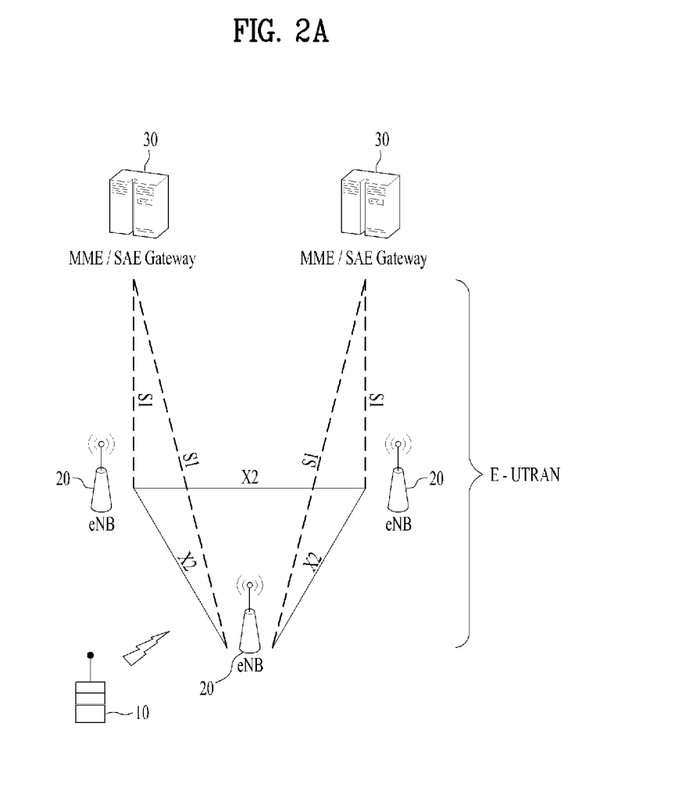
FIG. 2a is a block diagram illustrating network structure of an evolved universal mobile telecommunication system (E-UMTS)

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
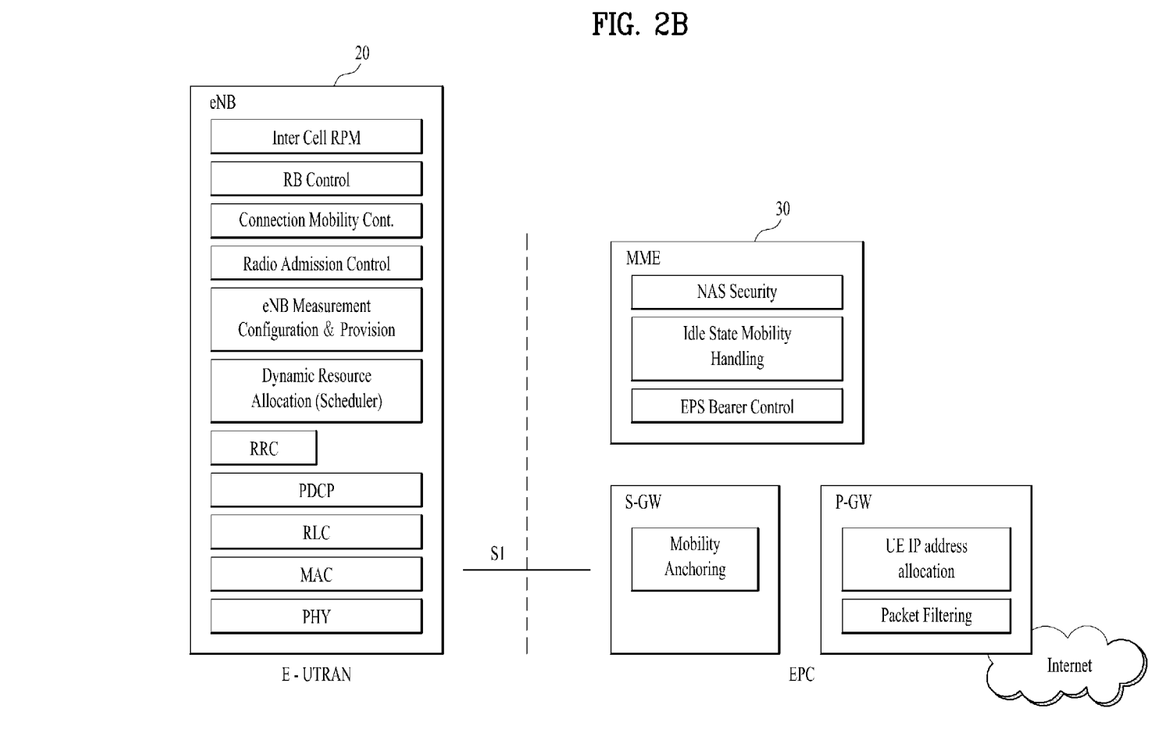
FIG. 2b is a block diagram depicting architecture of a typical E-UTRAN and a typical EPC.

FIG. 2b is a block diagram depicting architecture of a typical E-UTRAN and a typical EPC.

As illustrated in FIG. 2b, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
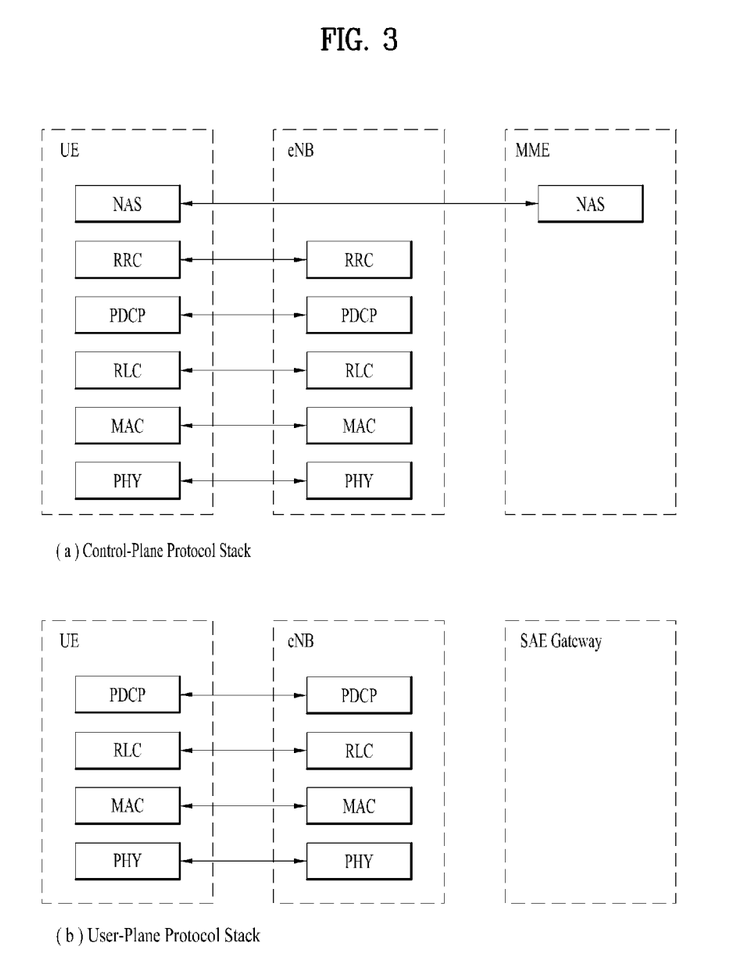
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
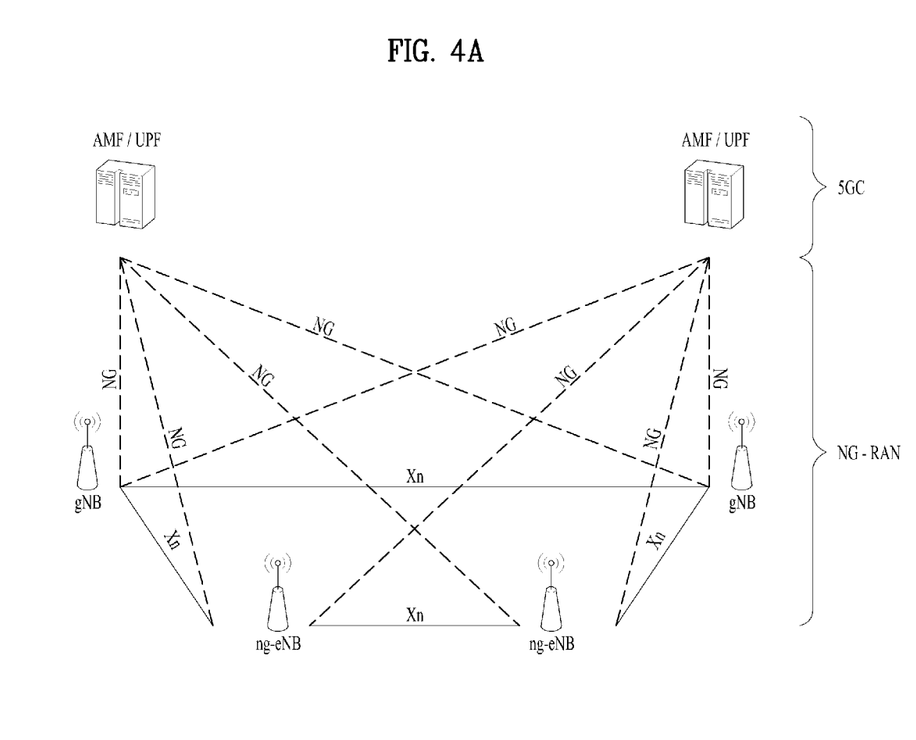
FIG. 4a is a block diagram illustrating network structure of NG Radio Access Network (NG-RAN) architecture.
Figure 4B:
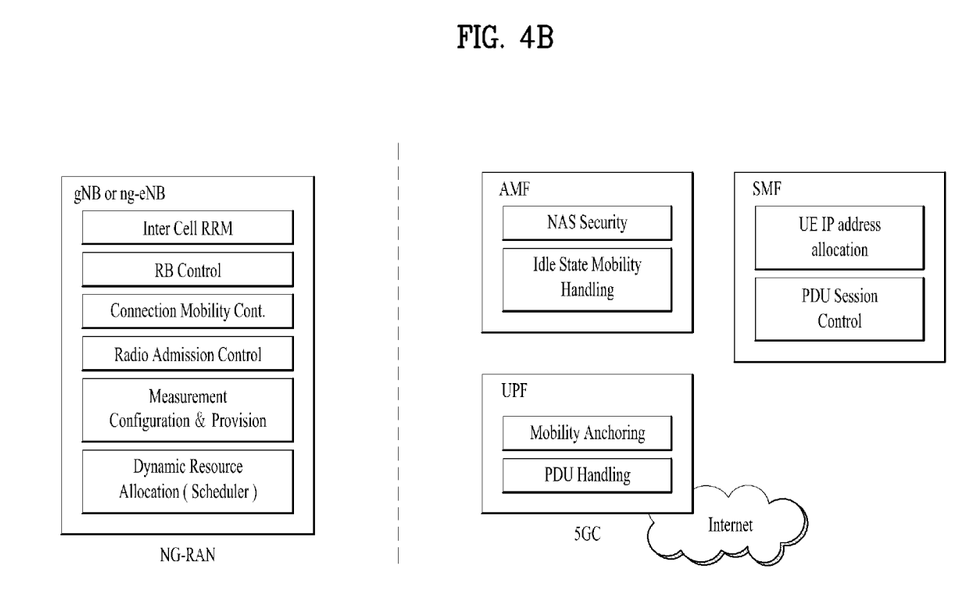
FIG. 4b is a block diagram depicting architecture of functional Split between NG-RAN and 5G Core Network (5GC)

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
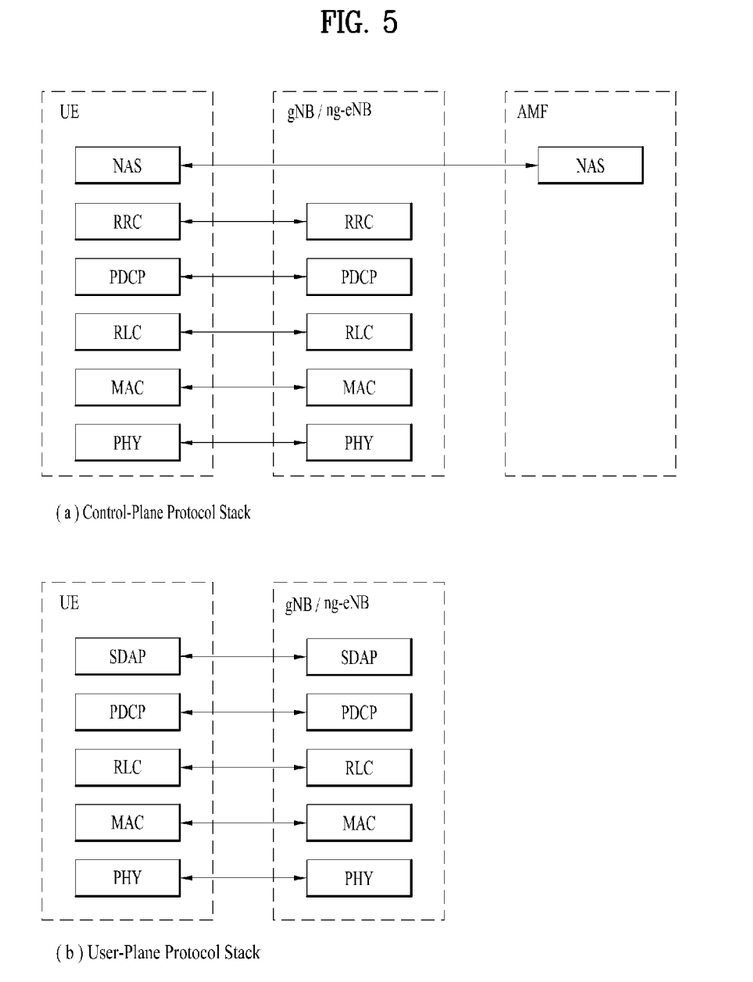
FIG. 5 is a diagram showing a control plane and a user plane of a radio interface protocol between a UE and a NG-RAN based on a 3rd generation partnership project (3GPP) radio access network standard.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
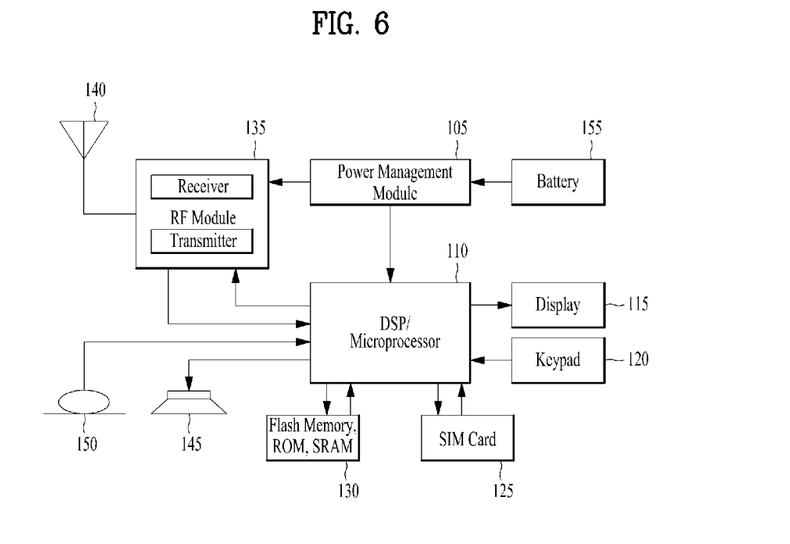
FIG. 6 is a block diagram of a communication apparatus according to an embodiment of the present invention.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 7:
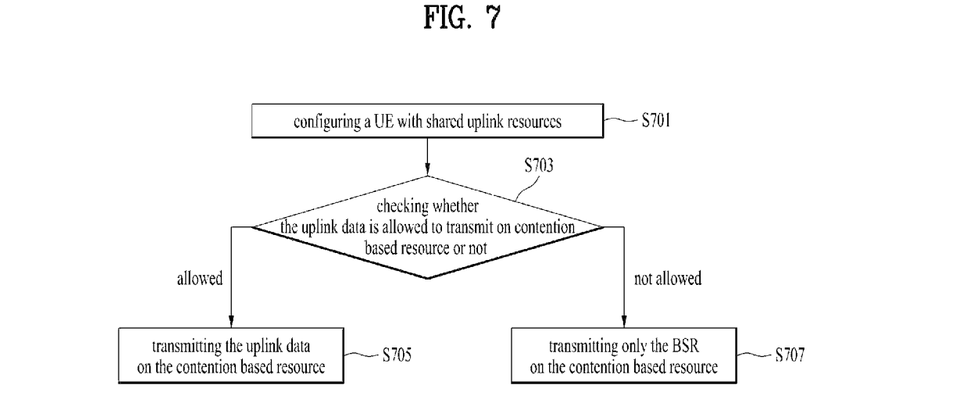
FIG. 7 is a conceptual diagram for transmitting uplink data which is robust to collision on shared uplink resource in wireless communication system according to embodiments of the present invention.

FIG. 7 is a conceptual diagram for transmitting uplink data which is robust to collision on shared uplink resource in wireless communication system according to embodiments of the present invention.

This embodiment describes from a UE perspective.

In this invention, if uplink data arrives at a UE, the UE checks whether the uplink data is allowed to contention based transmission or not. If the uplink data is allowed to contention based transmission, the UE transmits the uplink data on the contention based resource. Otherwise, if the uplink data is not allowed to contention based transmission, the UE transmits a BSR on the contention based resource without any uplink data. The BSR reports the amount of uplink data of logical channel not allowed for contention based transmission.

More specifically, the UE is configured with shared uplink resources (S701).

Preferably, the shared uplink resource is SPS resource or more than one UE can be allocated with the same resource, i.e., contention occurs, i.e., the resource is used for contention based transmission.

When uplink data becomes available for transmission, the UE checks whether the uplink data is allowed to transmit on contention based resource or not (S703).

For this checking, the UE receives from a network information for checking whether the uplink data is allowed to transmit on contention based resource or not.

The information includes as follows: i) logical channel configuration information including an indication indicating whether the logical channel data is allowed to contention based transmission, or ii) resource configuration information including logical channel information allowed to be transmitted on the resource, or iii) the logical channel information refers to e.g., logical channel priority, logical channel identity, traffic type, or amount of data.

If the UE considers that the uplink data is allowed to contention based transmission, the UE transmits the uplink data on the contention based resource, i.e., the UE generates a MAC PDU to be transmitted on the contention based resource by including the uplink data (S705), and the UE does not transmit the BSR. That is, the UE does not trigger the BSR by the uplink data that is allowed to contention based transmission.

If the UE considers that the uplink data is not allowed to contention based transmission, the UE transmits only the BSR on the contention based resource, where the BSR reports only the amount of uplink data that is not allowed to contention based transmission (S707). In other words, the BSR does not report the amount of uplink data that is allowed to contention based transmission. The UE does not transmit the uplink data on the contention based resource, i.e., the UE generates a MAC PDU to be transmitted on the contention based resource by not including the uplink data.

When the BSR is received on the contention based resource, the network recognizes that the UE wants to transmit important data, and would allocate dedicated UL grant to the UE.

The purpose of the UE transmitting the BSR to the network is to receive a dedicated UL grant from the network for transmission of the data indicated by that BSR. In that respect, the BSR including the amount of uplink data that is not allowed to contention based transmission may be transmitted using an uplink grant. However, if the UE transmits the uplink grant in case that the uplink data is not allowed to the contention based transmission, the UE should get a ready for the new transmission to use the uplink grant. As a result, as a means for a dedicated UL grant request, transmission of the BSR using an uplink grant may cause a larger delay than using a contention based resource. That is, if the BSR proposed by the present invention is transmitted using the allocated content-based resource, it is advantageous in that a faster dedicated UL grant can be requested.

Preferably, if there are both of uplink data that is allowed to contention based transmission and not allowed to contention based transmission, the UE transmits only the BSR on the contention based resource, i.e., the UE doesn't transmit uplink data that is allowed to contention based transmission even if there is remaining space after including the BSR in the MAC PDU that is to be transmitted on the contention based resource.

Preferably, the UE can be NB-IoT UE. In fact, if NB-IoT UEs in a cell are stationary and used only for metering, timing alignment may be synchronized with network for a long time, even longer than 12 hours. Of course, if some obstacles are coming and leaving, the obstacles can break TA synchronization but it would be temporary interruption unless those ones take a place permanently. Thus, TA may be kept in synchronized without timing alignment procedure. In addition, periodic TAU (Tracking Area Update) also would not be needed if a NB-IoT UE has no mobility and relocation is not happened until battery is dead. A network may check TAU of a NB-IoT UE only when the network wants. From the resource point of view, the SPS resource would be a shared SPS resource because it may not be realistic to allocate the dedicated SPS resource to each UE in a cell, even though long-time regular transmission is considered. Assuming a shared SPS resource, contention/collision on the shared SPS resource is inevitable. However, when collision happens on the shared SPS resource, retransmission or resolution may not be needed because the network gathers metering reports from a lot of UEs and calculate the results based on lots of reports. In using UL SPS for metering, it would be helpful to differentiate SPS resource depending on e.g., type of data, or event. For example, the network may want to allocate SPS resource with less or no collision for the data reported in emergency case while allocating SPS resource with reasonable collision for regular metering report in normal case. Therefore, it would be necessary to allocate multiple SPS resources for a UE, where each SPS resource is associated with specific types of data, event, or logical channels. On the other hand, if only one SPS resource is allocated to a UE, the UE has to transmit all types of data on the shared SPS resource. However, the UE may have data that requires less or no collision. In this case, it is harmful for the UE to transmit such important data on the shared SPS resource. Thus, it is necessary that the UE is allowed to transmit only BSR on the shared SPS resource depending on the type of data. When the BSR is received on the shared SPS resource, the network recognizes that the UE wants to transmit important data, and would allocate dedicated UL grant to the UE. Given that UL SPS for metering, the NB-IoT UE is most likely in RRC_IDLE or RRC_INACTIVE, we think the SPS configuration information should be broadcasted via System Information.

The proposed method is implemented by a UE, shown in FIG. 6, but it can be any apparatus for performing the same operation.

As shown in FIG. 6, the UE may comprises a DSP/microprocessor (110) and RF module (transceiver; 135). The DSP/microprocessor (110) is electrically connected with the transceiver (135) and controls it.

Specifically, FIG. 6 may represent the UE comprising a receiver (135), and a transmitter (135). These receiver and the transmitter can constitute the transceiver (135). The UE further comprises a processor (110) operably coupled with the transmitter and the receiver (135: receiver and transmitter). The processor (110) is configured to check whether uplink data is allowed to transmit on contention based resource or not, when the uplink data becomes available for transmission, and transmit, via the transmitter, a buffer status reporting (BSR) on the contention based resource without any uplink data, if the uplink data is not allowed to transmit on the contention based resource.

Figure 8:
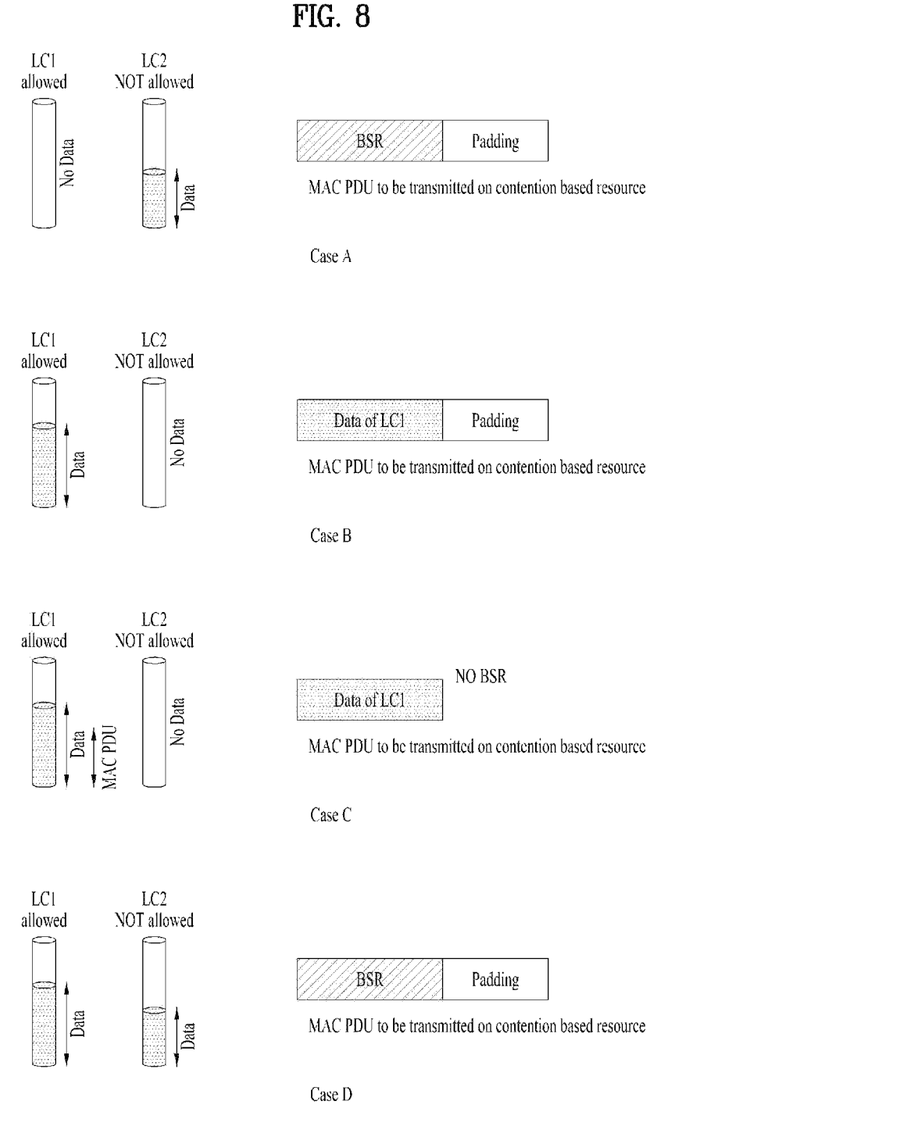
FIG. 8 is examples for transmitting uplink data which is robust to collision on shared uplink resource in wireless communication system according to embodiments of the present invention.

FIG. 8 is examples for transmitting uplink data which is robust to collision on shared uplink resource in wireless communication system according to embodiments of the present invention.

In case A, if UL data is from a logical channel that is not allowed to contention based resource (i.e. LC2), the UE transmits only the BSR, where the BS of BSR is set to the amount of data of a logical channel that is not allowed to contention based resource.

In case B, if UL data is from a logical channel that is allowed to contention based resource (i.e. LC1), the UE transmits the UL data.

In case C, if UL data is from a logical channel that is allowed to contention based resource (i.e. LC1), the UE transmits the UL data. Although the MAC PDU cannot accommodate all UL data from the logical channel, the UE doesn't transmit a BSR. For this, the UE doesn't trigger a BSR.

In case D, if UL data is from both of a logical channel that is allowed to contention based resource (LC1) and a logical channel that is not allowed to contention based resource (LC2), the UE transmits only the BSR. The UE doesn't transmit UL data from LC2 even if there is remaining space in the MAC PDU after including BSR.

Figure 9:
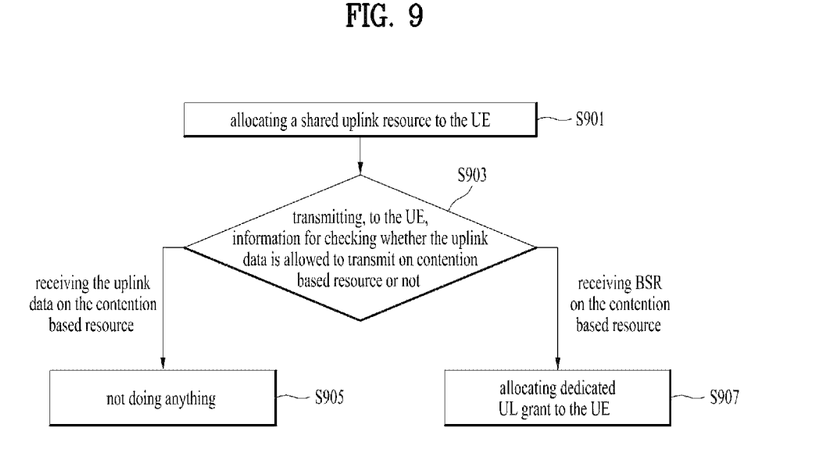
FIG. 9 is a conceptual diagram for receiving uplink data which is robust to collision on shared uplink resource in wireless communication system according to embodiments of the present invention.

FIG. 9 is a conceptual diagram for receiving uplink data which is robust to collision on shared uplink resource in wireless communication system according to embodiments of the present invention.

This embodiment describes from a base station perspective.

The network allocates a shared uplink resource to the UE (S901).

Preferably, the shared uplink resource is SPS resource or more than one UE can be allocated with the same resource, i.e., contention occurs, i.e., the resource is used for contention based transmission.

And the networks transmits to the UE information for checking whether the uplink data is allowed to transmit on contention based resource or not (S903).

The information includes as follow: i) logical channel configuration information including an indication indicating whether the logical channel data is allowed to contention based transmission, or ii) resource configuration information including logical channel information allowed to be transmitted on the resource, or iii) the logical channel information refers to e.g., logical channel priority, logical channel identity, traffic type, or amount of data.

If the network receives the uplink data on the contention based resource, the network doesn't need to do anything (S905). When network receives a BSR including the amount of uplink data that is not allowed to contention based transmission, the network recognizes that the UE wants to transmit important data, and would allocate dedicated UL grant to the UE (S907).

The proposed method is implemented by a network apparatus, shown in FIG. 6, but it can be any apparatus for performing the same operation.

As shown in FIG. 6, the network apparatus may comprises a DSP/microprocessor (110) and RF module (transceiver; 135). The DSP/microprocessor (110) is electrically connected with the transceiver (135) and controls it.

Also, FIG. 6 may represent a network apparatus comprising a receiver (135), and a transmitter (135). These transmitter and receiver may constitute the transceiver (135). The network further comprises a processor (110) operably coupled with the transmitter and the receiver (135: receiver and transmitter). The processor (110) is configured to allocate a shared uplink resource to the UE via the receiver, and transmit to the UE information for checking whether the uplink data is allowed to transmit on contention based resource or not via the transmitter. And if the network receives the uplink data on the contention based resource, the processor doesn't need to do anything. When receiver receives a BSR including the amount of uplink data that is not allowed to contention based transmission, the processor recognizes that the processor wants to transmit important data, and would allocate dedicated UL grant to the UE via the transmitter.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method for a user equipment (UE) operating in a wireless communication system, the method comprising:
    configuring a first logical channel that is allowed to transmit first uplink data on a contention based resource and a second logical channel that is not allowed to transmit second uplink data on the contention based resource;
    based on the first uplink data becoming available for transmission and the second uplink data not becoming available for transmission, transmitting a first medium access control (MAC) protocol data unit (PDU) including a portion of the first uplink data, wherein first buffer status reporting (BSR) for the first uplink data is not triggered even when the first MAC PDU cannot accommodate all of the first uplink data; and
    based on both of the first uplink data and the second uplink data becoming available for transmission, transmitting a second MAC PDU including second BSR for the second uplink data on the contention based resource, wherein the first uplink data and the second uplink data are not transmitted with the second BSR even when there is remaining space in the MAC PDU after including the second BSR.

2. The method according to claim 1, wherein the second BSR includes a portion of the second uplink data of the second logical channel that is allowed for transmission to the second uplink data on the contention based resource.

3. The method according to claim 1, wherein the contention based resource is a shared uplink resource with more than one UE.

4. The method according to claim 1, further comprising:
    receiving logical channel configuration information for the first logical channel and the second logical channel, wherein the logical channel configuration information includes information on whether the first logical channel is allowed to transmit the first uplink data on the contention based resource and whether the second logical channel is allowed to transmit the second uplink data on the contention based resource, or
    receiving resource configuration information for the contention based resource, wherein the resource configuration information includes information on whether the contention based resource is allowed for transmission of the first uplink data from the first logical channel and for transmission of the second uplink data from the second logical channel.

5. The method according to claim 4, wherein the logical channel configuration information further includes information on a logical channel priority, a logical channel identity, a traffic type, or an amount of data for the first logical channel and the second logical channel.

6. The method according to claim 1, wherein the UE is capable of communicating with at least one of another UE, a UE related to an autonomous driving vehicle, a base station and/or a network.

7. A user equipment (UE) operating in a wireless communication system, the UE comprising:
    a transmitter and a receiver; and
    a processor operably coupled to the transmitter and receiver and configured to:
    configure a first logical channel that is allowed to transmit first uplink data on a contention based resource and a second logical channel that is not allowed to transmit second uplink data on the contention based resource;
    based on the first uplink data becoming available for transmission and the second uplink data not becoming available for transmission, transmit a first medium access control (MAC) protocol data unit (PDU) including a portion of the first uplink data, wherein first buffer status reporting (BSR) for the first uplink data is not triggered even when the first MAC PDU cannot accommodate all of the first uplink data; and
    based on both of the first uplink data and the second uplink data becoming available for transmission, transmit a second MAC PDU including second BSR for the second uplink data on the contention based resource, wherein the first uplink data and the second uplink data are not transmitted with the second BSR even when there is remaining space in the MAC PDU after including the second BSR.

8. The UE according to claim 7, wherein the second BSR includes a portion of the second uplink data of the second logical channel that is allowed for transmission to the second uplink data on the contention based resource.

9. The UE according to claim 7, wherein the contention based resource is a shared uplink resource with more than one UE.

10. The UE according to claim 7, wherein the processor is configured to:
    receive logical channel configuration information for the first logical channel and the second logical channel, wherein the logical channel configuration information includes information on whether the first logical channel is allowed to transmit the first uplink data on the contention based resource and whether the second logical channel is allowed to transmit the second uplink data on the contention based resource, or
    receive resource configuration information for the contention based resource, wherein the resource configuration information includes information on whether the contention based resource is allowed for transmission of the first uplink data from the first logical channel and for transmission of the second uplink data from the second logical channel.

11. The UE according to claim 10, wherein the logical channel configuration information includes information on a logical channel priority, a logical channel identity, a traffic type, or an amount of data for the first logical channel and the second logical channel.

12. The UE according to claim 7, wherein the UE is capable of communicating with at least one of another UE, a UE related to an autonomous driving vehicle, a base station and/or a network.

* * * * *